United States Patent
Brothers et al.

(10) Patent No.: US 9,678,637 B1
(45) Date of Patent: Jun. 13, 2017

(54) PROVIDING CONTEXT-BASED PORTIONS OF CONTENT

(71) Applicant: Audible, Inc., Newark, NJ (US)

(72) Inventors: Nathan Garret Brothers, New York, NY (US); Guy Ashley Story, Jr., New York, NY (US); Douglas Cho Hwang, New York, NY (US); Ajay Arora, New York, NY (US); Douglas Scott Goldstein, Riverdale, NY (US)

(73) Assignee: Audible, Inc., Newark, NJ (US)

( * ) Notice: Subject to any disclaimer, the term of this patent is extended or adjusted under 35 U.S.C. 154(b) by 526 days.

(21) Appl. No.: 13/915,371

(22) Filed: Jun. 11, 2013

(51) Int. Cl.
*G06F 3/00* (2006.01)
*G06F 3/0484* (2013.01)

(52) U.S. Cl.
CPC .................................. *G06F 3/0484* (2013.01)

(58) Field of Classification Search
CPC .... G06F 3/0483; G06F 1/1652; G06F 3/0488; G06F 1/1647; G06F 3/0485; G06F 3/04883; G06F 15/0291; G06F 17/2235; G06F 17/241; G06F 17/2735; G06F 17/2755; G06F 1/1616; G06F 17/212; G06F 17/3089

See application file for complete search history.

(56) References Cited

U.S. PATENT DOCUMENTS

| | | | |
|---|---|---|---|
| 8,510,247 B1* | 8/2013 | Kane, Jr. ................. | G06N 5/02 706/46 |
| 2002/0041692 A1 | 4/2002 | Seto et al. | |
| 2005/0149496 A1* | 7/2005 | Mukherjee et al. ............. | 707/3 |
| 2007/0074619 A1 | 4/2007 | Vergo | |
| 2009/0006336 A1 | 1/2009 | Forstall et al. | |
| 2009/0187540 A1* | 7/2009 | Richardson et al. ............. | 707/3 |
| 2012/0191726 A1 | 7/2012 | Markus et al. | |
| 2013/0159853 A1 | 6/2013 | Story, Jr. et al. | |
| 2013/0253833 A1* | 9/2013 | Tuukkanen ............ | G01C 21/26 701/538 |
| 2013/0259399 A1* | 10/2013 | Ho et al. ........................ | 382/276 |
| 2014/0033027 A1* | 1/2014 | Polo et al. ..................... | 715/252 |
| 2014/0074648 A1* | 3/2014 | Morton et al. ............... | 705/26.7 |

OTHER PUBLICATIONS

Buirey, Pascal, 'How Google Map Works', Jan. 7, 2008, available at http://www.codeproject.com/Articles/14793/Ho-Google-Map-Works, accessed on May 20, 2013.

(Continued)

*Primary Examiner* — Di Xiao
(74) *Attorney, Agent, or Firm* — Knobbe, Martens, Olson & Bear, LLP

(57) ABSTRACT

Systems and methods are provided for recommending a portion of one or more content items to be consumed in a given context. For example, a recommendation service may receive context information associated with a user's current context, where the context may be associated with a geographic location, an activity or other information. The recommendation service may then determine one or more recommended portions of one or more content items to be consumed in the given context, where the determination may be based in part on content characteristics of the one or more recommended portions.

24 Claims, 6 Drawing Sheets

(56) References Cited

OTHER PUBLICATIONS

De Rosa, Aurelio, "Working with Geolocation and the Google Maps API," Dec. 21, 2012, available at http://www.sitepoint.com/working-with-geolocation-and-google-maps-api/, accessed on Dec. 10, 2013.
U.S. Appl. No. 13/712,721, to Story Jr., filed Dec. 12, 2012.
U.S. Appl. No. 13/526,330, to Goldstein et al., filed Jun. 18, 2012.

* cited by examiner

PROVIDING CONTEXT-BASED PORTIONS OF CONTENT

BACKGROUND

Electronic commerce is a popular way of selling items, such as digital content items, to consumers. A typical electronic commerce system may provide user interfaces that enable consumers to browse and/or purchase items from a merchant or seller associated with the electronic commerce system. Recommendation components or engines are sometimes used by electronic commerce systems to suggest or recommend items to their customers. Often, the items are recommended based on purchase or browse histories of users. Recommendation components or engines typically attempt to identify and/or present items that may be of general interest to a given user. For example, an electronic commerce service may provide a list of recommended items for a user that are selected based on a determination that the recommended items are similar to items that the given user has purchased or browsed in the past. As another example, some recommendation services may recommend items that have been previously purchased by users with similar interests to the given user. Generally, when determining a content item to recommend to a user, a typical recommendation service considers information regarding the user, but does not take into account information regarding an expected environment or context in which the user will consume the content.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
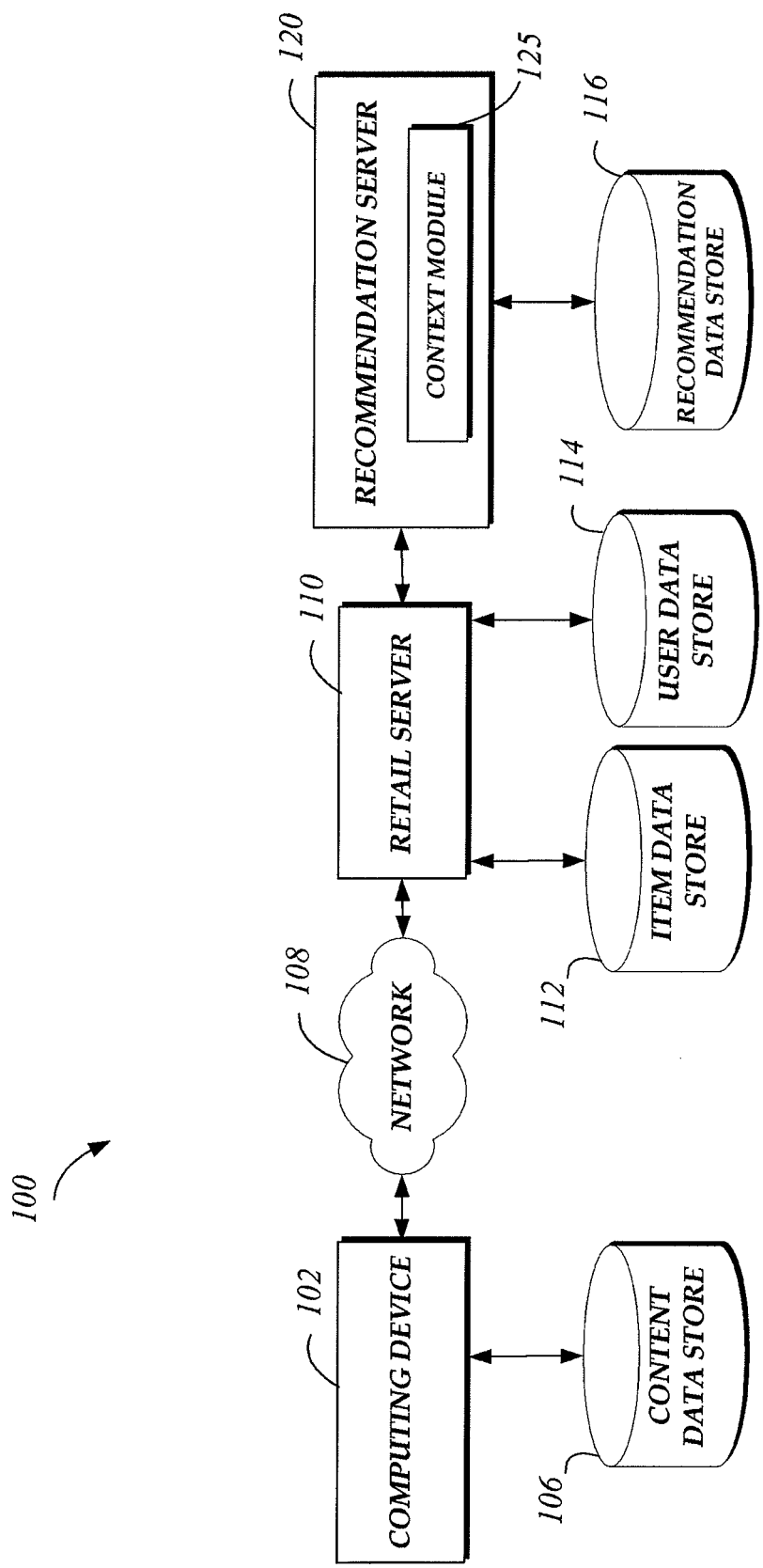
FIG. 1 is a block diagram depicting an illustrative operating environment in which recommended portions of content items may be presented to a user based at least in part on context information received from a user's computing device.

Generally described, aspects of the present disclosure relate to providing a user with a recommendation of one or more portions of one or more content items to consume in a given context. For example, a context module as disclosed herein may determine one or more audio clips or other content portions from content items of various types, where the content portions are recommended for a user to listen to or otherwise consume while the user is in a certain geographic location, engaged in a certain activity, and/or in some other known or determined context in which the user is involved or engaging. In some embodiments, the context in which the content portion is to be consumed may be determined based on information received by the context module from a computing device of the user, such as geographic location data, activity data, time and date information, calendar entries, and/or other information. When context information is received from a user's computing device, such as context information describing the user's current location and/or activity, the context module may retrieve content characteristic information associated with each of a number of content portions in order to recommend one or more content portions with characteristics that are appropriate and/or relevant for the user's current context, or which are thematically-related to the user's context. The characteristics of a given portion of content may include, for example, a genre, a mood, a geographical setting, a historical setting, and/or a time of day of the portion of content.

As an example, according to one embodiment, a user may be exercising by running through New York's Central Park, accompanied by her mobile phone or other computing device. Based at least in part on context information received from the computing device, which may include geographic location and movement data, a context module, as disclosed herein, may determine portions of a number of audio books to be played to the user during her run. For example, the context module may select to present to the user audio of an inspirational scene in a novel in which a character is running. As another example, the context module may select to present audio of a scene from a favorite book of the user that takes place in Central Park.

As will be discussed further below, a context module may determine recommendations based on a variety of context attributes and/or other information, such as the time of day, time of year, geographic region, activity information, a user's calendar entries, weather information, etc. Depending on the embodiment, a recommendation service described herein may recognize and recommend content for a variety of context types, such as driving routes, geographic locations, a specific room or type of room within a building or house (such as a bedroom, kitchen, etc.), a physical activity or exercise (such as running or weightlifting), a mode of transportation (such as taking a train), or a daily activity (such as grocery shopping, mowing the lawn, cooking, eating a meal, etc.).

While audio books are often used as example content items in the present disclosure, it should be appreciated that items, in some embodiments, may include any item capable of being listened to, watched, played or otherwise consumed by a user. In some embodiments, items from which portions may be recommended to a user may include digital content items, such as audio books or other spoken word audio recordings, electronic books, videos, podcasts, computer games, movies, songs, albums, playlists and/or digital content items of other types. In other embodiments, portions of digital content recommended to a user may be associated with physical goods, such that a user selecting to consume the content in full may purchase a physical book, magazine, game and/or other type of media that stores audio and/or visual content.

The illustrative operating environment shown in FIG. 1 includes a system 100 in which users may browse and place orders for items (such as products listed in an electronic catalog), as well as be presented with recommended portions of content selected by the recommendation server 120 based at least in part on a user's current context. Depending on the embodiment, the recommended content portions may be selected from content that the user has previously purchased and/or content that the user has not previously purchased or otherwise accessed. The system 100 may include one or more recommendation servers 120 that include a context module 125 that may be used to implement various aspects of the present disclosure, such as determining context information, determining characteristics of portions of content items, and recommending a portion of content based on a context in which the portion will be consumed. The environment also includes one or more optional retail servers 110 that may facilitate electronic browsing and purchasing of items, such as digital content items, using various user devices, such as computing device 102. Those skilled in the art will recognize that the computing device 102 may be any of a number of computing devices that are capable of communicating over a network including, but not limited to, a laptop, personal computer, personal digital assistant (PDA), hybrid PDA/mobile phone, mobile phone, electronic book reader, digital media player, tablet computer, and the like.

The recommendation server 120, which will be described below in more detail, may be connected to or in communication with a recommendation data store 116 that may store information regarding associations between portions of content items and characteristics of the content and/or associations between portions of content items and context attributes associated with one or more contexts in which the portion is appropriate or recommended to be consumed. The retail server 110 may be connected to or in communication with an item data store 112 that stores item information regarding a number of items, such as items available for browse and/or purchase via the retail server 110. Item data stored in item data store 112 may include any information related to each item. For example, item data may include, but is not limited to, price, availability, title, item identifier, item feedback (e.g., user reviews, ratings, etc.), item image, item description, item attributes, keywords associated with the item, etc. In some embodiments, the item data store 112 may store digital content items (e.g., audiobooks, electronic books, music, movies, multimedia works, text documents, etc.). In other embodiments, the information in item data store 112 and recommendation data store 116 may be stored in a single data store connected to or in communication with the recommendation server 120 and/or retail server 110.

The retail server 110 may also be connected to or in communication with a user data store 114 that stores user data associated with users of retail server 110, such as purchase history, browsing history, item reviews and ratings, personal information, user preferences, location information, activity information, context consumption history associated with specific contexts, etc. The computing device 102 may be connected to or in communication with a content data store 106, which may store content items that the user has purchased or otherwise obtained from the retail server 110 and/or another data source.

In different embodiments, each of item data store 112, user data store 114 and/or recommendation data store 116 may be local to recommendation server 120, may be local to retail server 110, may be remote from both recommendation server 120 and retail server 110, and/or may be a network-based service itself. In the environment shown in FIG. 1, a user of the system 100 may utilize computing device 102 to communicate with the retail server 110 via a communication network 108, such as the Internet or other communications link. The network 108 may be any wired network, wireless network or combination thereof. In addition, the network 108 may be a personal area network, local area network, wide area network, cable network, satellite network, cellular telephone network, etc. or combination thereof. Protocols and components for communicating via the Internet or any of the other aforementioned types of communication networks are well known to those skilled in the art and, thus, are not described in more detail herein.

The system 100 is depicted in FIG. 1 as operating in a distributed computing environment comprising several computer systems that are interconnected using one or more computer networks. The system 100 could also operate within a computer system having a fewer or greater number of components than are illustrated in FIG. 1. Thus, the depiction of system 100 in FIG. 1 should be taken as illustrative and not limiting to the present disclosure. For example, the system 100 could implement various Web services components and peer-to-peer network configurations to implement at least a portion of the processes.

In brief, the retail server 110 is generally responsible for providing front-end communication with various user devices, such as computing device 102, via network 108. The front-end communication provided by the retail server 110 may include generating text and/or graphics, possibly organized as a user interface using hypertext transfer or other protocols in response to information inquiries received from the various user devices. The retail server 110 may obtain information on available goods and services from one or more data stores, such as item data store 112, as is done in conventional electronic commerce systems. In certain embodiments, the retail server 110 may also access item data from other data sources, either internal or external to system 100. While system 100 illustrates an embodiment in which the recommendation server 120 communicates with a retail server 110, in other embodiments, a recommendation server 120 may operate independently of a retail environment. In such embodiments, the recommendation server 120 may communicate with the computing device 102 and/or item data store 112 without the presence of a retail server. In other embodiments, the computing device 102 may include a context module, as described herein, such that a separate recommendation server and/or retail server may not be present in certain embodiments.

Figure 2:
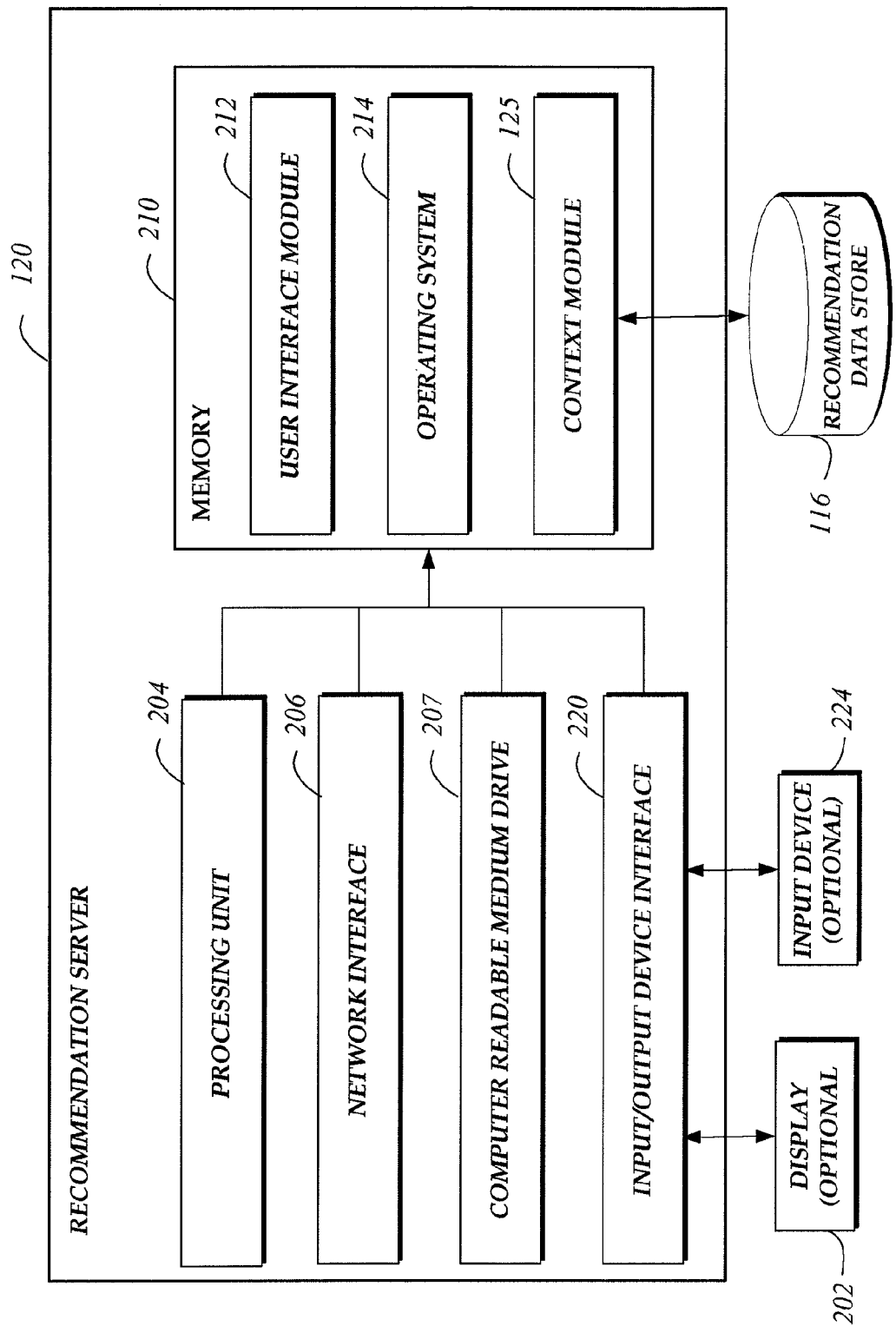
FIG. 2 depicts a general architecture of a computing device for generating recommendations of content portions to be consumed by a user in a given context.

FIG. 2 depicts an example of a general architecture of a recommendation server 120 for determining characteristics of content and for determining content portions to recommend to a user based at least in part on the user's context. The general architecture of the recommendation server 120 depicted in FIG. 2 includes an arrangement of computer hardware and software components that may be used to implement aspects of the present disclosure. The recommendation server 120 may include many more (or fewer) components than those shown in FIG. 2. It is not necessary, however, that all of these generally conventional components be shown in order to provide an enabling disclosure. As illustrated, the recommendation server 120 includes a network interface 206, a processing unit 204, an input/output device interface 220, a display 202, an input device 224, and a computer readable medium drive 207, all of which may communicate with one another by way of a communication bus. The network interface 206 may provide connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, microphone, touch screen, etc.

The memory 210 contains computer program instructions that the processing unit 204 executes in order to implement one or more embodiments. The memory 210 generally includes RAM, ROM and/or other persistent, auxiliary or non-transitory computer-readable media. The memory 210 may store an operating system 214 that provides computer program instructions for use by the processing unit 204 in the general administration and operation of the recommendation server 120. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a web browser installed on the computing device. In addition, memory 210 may include or communicate with an auxiliary recommendation data store 116 and/or one or more other data stores, as discussed above with reference to FIG. 1.

In addition to the user interface module 212, the memory 210 may include a context module 125 that may be executed by the processing unit 204. In one embodiment, the context module 125 implements various aspects of the present disclosure, e.g., associating content characteristics with portions of content, selecting portions of content to be presented in a given context, etc., as described further below. While the context module 125 is shown in FIG. 2 as part of the recommendation server 120, in other embodiments, all or a portion of a context module may be a part of the retail server 110 and/or a user computing device, such as computing device 102. For example, in certain embodiments of the present disclosure, the retail server 110 may include several components that operate similarly to the components illustrated as part of the recommendation server 120, including a user interface module, context module, processing unit, computer readable medium drive, etc. In such embodiments, the retail server 110 may communicate with a recommendation data store, such as recommendation data store 116 and the recommendation server 120 may not be needed in certain embodiments. Further, although certain examples are illustrated herein in the context of a retail server 110, this is not a limitation on the systems and methods described herein. For example, in some embodiments, a recommendation server as disclosed herein may provide information identifying recommended portions of content to a user outside of a retail context. For example, a context module may recommend portions of content to a user that may be consumed in part or in full without being purchased, and/or may select recommended portions from content that has already been purchased or otherwise obtained by the user.

While in the illustrated embodiment the recommendation service is implemented by the recommendation server 120, in other embodiments, the recommendation service may be implemented partially or entirely by the user computing device 102. For example, the recommendation service may be provided as specialized application software and/or hardware on the user computing device 102. Accordingly, the user computing device 102 may include a context module 125 and other components that operate similarly to the components illustrated as part of the recommendation server 120, including a processing unit 204, network interface 206, non-transitory computer-readable medium drive 207, input/output interface 220, memory 210, user interface module 212, and so forth. In some embodiments, the user computing device 102 may communicate in a peer-to-peer manner with one or more other computing devices in association with generating content recommendations.

Figure 3:
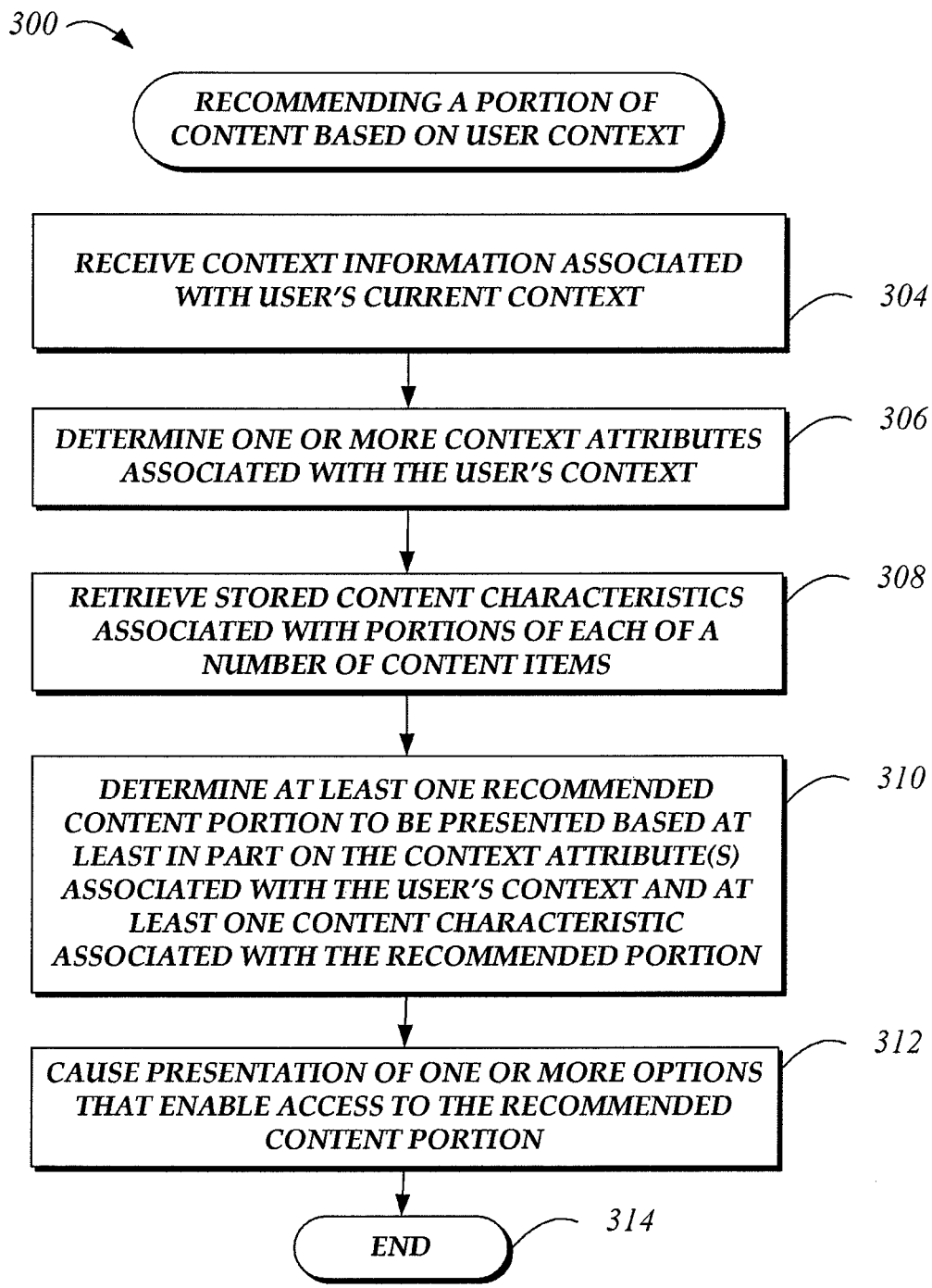
FIG. 3 is a flow diagram of an illustrative method implemented by a context module for recommending a portion of content to be consumed by a user based at least in part on the user's context.

FIG. 3 is a flow diagram of an illustrative method 300 implemented by the context module 125 for recommending a portion of content, such as an audio clip or excerpt from a larger work, to be presented to a user in a given context. The illustrative method 300 begins at block 304, where the context module 125 receives context information associated with a user's current context. For example, in a case in which the user is utilizing computing device 102, the context module 125 may receive the context information from the computing device 102. Depending on the embodiment, the context information may include information of a variety of types, as discussed below.

Examples of context information, in some embodiments, may include data indicating a current location of the computing device 102, route information indicating a route that the user plans to travel or is currently travelling, an activity that the user is engaging in or plans to engage in, a current mood of the user, time information, and/or various other types of data indicating a time, place, situation, mood, activity level, movement, environment information, etc. In some embodiments, the context information may be determined based at least in part on information extracted from events or meetings on a user's electronic calendar, the user's status information associated with a social network or other service, items on a to-do list or task list, and/or similar status or scheduling information. In some embodiments, input from a microphone of the computing device 102 may provide information regarding how loud the user's environment is. Similarly, in some embodiments, input from a light sensor or camera of the computing device 102 may provide information regarding how bright or dark the user's current environment is. Information from an accelerometer, gyroscope or other device associated with the computing device 102 may provide information regarding a relative movement or activity level of the user.

The context information received at block 304 may include information provided by a user and/or information determined at least in part by the user computing device 102. For example, in some embodiments, the context module may enable the user to enter or select context attributes that describe the user's current context and/or that describe a context in which the user would like to receive content portion recommendations. As a few examples, the user may indicate, in some such embodiments, that the user is planning to drive a certain route (such as by specifying a start location and end location), is planning to run along a certain path, is planning to visit a certain monument, is studying and/or engaging in any of a variety of other activities. The user may enter or select context information, in some embodiments, by selecting from one or more probable contexts or context attributes that the context module 125 has determined may be appropriate or applicable to the user's current or future context. In other embodiments, the user may alternatively or additionally enter a text string that describes the context, which may then be parsed by the context module 125 to identify known context information.

In some embodiments, the context information may be determined without explicit user indication. For example, the computing device 102 may utilize global positioning system (GPS) information or other geographic location information (such as information determined via multilateration of radio signals between radio towers or cellular network towers) to determine a current location of the user, a direction in which the user is moving, a speed of the user's movement, etc. Additional context information may be determined from such location data, such as traffic conditions near the user or along the user's route, population density in the area, the environment (e.g., whether a city or rural area), travel information (e.g., flight information or train schedules), meteorological information, and/or other information. In some embodiments, additional sensors or devices that are included in or in communication with the computing device 102 may provide additional context information, such as the user's heart rate, blood pressure or other vital signs.

At block 306, the context module 125 may determine one or more context attributes associated with the user's current context. In some embodiments, the context attributes may be provided directly in the context information received at block 304. In other embodiments, the context attributes may be determined based at least in part by analyzing the received context information. For example, if the context information includes a geographic location and/or a route being traveled by the user, the context module 125 may determine context attributes associated with the given location or route based at least in part on map data and/or other reference data. Context attributes determined for a given route or location at block 306 could include, for example, that the location is in the countryside and in an area with low population. In some embodiments, nearby objects and/or landmarks may be determined by the context module from map data and/or other location data. For example, the context module may determine that the user is in a specific museum that contains a given well-known painting, or that the user is walking near the Eiffel Tower. As another example, context attributes determined for a given activity may include that the user is at a gym (which may be based on location data received at block 304), and is likely to be running laps (which may be based on movement data indicating that the user is repeatedly moving in a circular pattern). Additional context attributes may be determined without referring to specific context information received from the user's computing device, such as the current time, current season, preferences or other user information associated with the given user or given user device. As will be appreciated, the specific types of context attributes determined at block 306 may depend on the type and extent of context information received at block 304, and may include a wide variety of context attribute types, depending on the embodiment.

In some embodiments, the context module 125 may determine a likely context based on a variety of data in combination. For example, the context module may determine that a user is likely in bed and planning to go to sleep soon based on an indication that the computing device 102 has only recently moved within a small space that is known to be within the user's bedroom, and that the current time is 11:00 pm. In certain embodiments, such determinations of likely context may be presented to the user for confirmation prior to content portion recommendations being generated. In certain embodiments, various types of information associated with the user may be considered in determining the context information. For example, the user data store 114 or other data source accessible to the recommendation server 120 may include information such as the geographic location of the user's home and office, the floor plan of certain houses or buildings associated with the user, the user's profession, typical travel or activity patterns of the user (e.g., times during which the user typically works or engages in other activities), etc.

Next, at block 308, the context module 125 retrieves context characteristics that may have been previously associated with various portions of content items, and/or with content items as a whole, in recommendation data store 116. In other embodiments, the context module 125 may analyze the content of one or more content items at block 308 in order to determine characteristics of the content in various portions of one or more items, such as different scenes, passages, quotes, excerpts or other portions of a content item. While block 308 is illustrated as a separate data retrieval block in method 300, in other embodiments, one or more recommended content portions may be determined at block 310 below by searching characteristic information in the recommendation data store for one or more content item portions appropriate for a given context without first retrieving data at block 308. In some embodiments, the retrieved or determined information for a given portion of content may indicate one or more objects associated with the content portion or one or more referents referenced in the content portion, instead of or in addition to characteristics of the portion. A referent may include, for example, an event, a character, a subject, a time, a place and/or a person, among others.

As discussed above, the characteristics of a given portion of content may include, for example, a genre, a mood, a geographical setting, a historical setting, a time of day of the portion of content, and/or other types of characteristics. In some embodiments, portions of content items may have been previously tagged or marked with characteristics, such as an indication that a given chapter of a book takes place at night in downtown Los Angeles and has a somber mood. In other embodiments, similar characteristic information may be stored in tables or other data in recommendation data store 116, which may include characteristic information of an item with references to positions in the item (such as a start and ending location in the content) associated with each characteristic.

Portions of an item may be demarcated, defined or determined in a number of ways, depending on the embodiment and/or on the type of content. For example, a portion of an electronic book may be a chapter, paragraph, page or other discrete section. In other embodiments, a portion may be dynamically determined by the context module 125 based on an analysis of the content in order to locate a scene shift, location shift, entrance of a new character, passage of time, and/or similar logical or narrative shift that may demarcate a narrative unit. Other examples of portions, in some embodiments, may be episodes, acts or scenes in a play in audiobook or electronic book form, pages of an electronic book, spoken or textual paragraphs, time increments for continuously conveyed content (e.g., audio content or video content), a poem within a book, a quote, a speech, etc. Other ways to divide a content item into portions are possible and within the scope of this disclosure.

In some embodiments, characteristic information may be stored as pairings of characteristic attributes and attribute values. For example, "mood" may be considered a characteristic attribute, and the associated attribute value for a given entry may be "energetic," "happy," "tired," "sad," etc. In other embodiments, characteristic information may be stored in a manner that describes a characteristic without reference to specific attribute types and corresponding values. For example, a characteristic associated with an item portion may be described by a word, phrase or narrative entry, such as "inspiring speech" or "description of 18th century London." In some embodiments, such narrative descriptions may be provided by users. For example, one or more users may have previously tagged, marked or otherwise indicated that certain portions of content should be associated with certain characteristics. The characteristic information, in some embodiments, may alternatively or additionally be determined at least in part based on automated content analysis by the context module or other module.

In some embodiments, a human interaction task system (not illustrated) may determine the characteristic information for content items and store the results in recommendation data store 116. Generally described, a human interaction task system may be a computerized system that electronically processes human interaction tasks (HITs). A HIT may be a difficult, time consuming, or expensive task for a computing device to perform. However, it might be relatively easy and quick for a human to perform a HIT. For example, in some embodiments, the recommendation server 120 may direct a human interaction task system to pose one or more queries about a content item to a human worker. In some embodiments, a human worker may be asked to identify characteristics of a content item and/or of particular portions of content within a content item. For example, a human interaction task system may convey a portion of a content item (such as a passage of text in an electronic book or an excerpt of an audiobook) to a human worker and ask the human worker to identify one or more characteristics that should be stored in association with the given portion in recommendation data store 116. In other embodiments, the recommendation server 120 may obtain information about a content item from a network resource such as a network-based encyclopedia or knowledge base. For example, a network-based encyclopedia may maintain summaries of one or more portions of an item, which may be accessed by the recommendation service in order to identify characteristic or context information.

In some embodiments, the recommendation server 120 may employ natural language techniques, semantic analysis, keyword searching, named entity extraction, or other content analysis techniques to determine the characteristic information stored in recommendation data store 116. Further information on the use of machine techniques to locate referents or objects associated with portions of content may be found in U.S. patent application Ser. No. 12/972,058, entitled "GRAPHICALLY REPRESENTING ASSOCIATIONS BETWEEN REFERENTS AND STORIES," filed on Dec. 17, 2010; and in U.S. patent application Ser. No. 12/881,021, entitled "SYSTEMS AND METHODS FOR ASSOCIATING STORIES WITH RELATED REFERENTS," filed on Sep. 13, 2010. The disclosures of both of these applications are hereby incorporated by reference in their entireties. Further information on the use of other machine techniques that may be used by the recommendation service to identify mood and other characteristics of content items and/or specific portions of content items may be found in U.S. patent application Ser. No. 13/526,330, entitled "SELECTING AND CONVEYING SUPPLEMENTAL CONTENT," filed on Jun. 18, 2012, the disclosure of which is hereby incorporated by reference in its entirety herein.

In some embodiments, the recommendation data store 116 may include information about characteristics that are global to an entire content item, e.g., to all portions of the content item. Such characteristics may include, for example, characteristics associated with the genre of the content item (e.g., horror, comedy, tragedy, etc.) or a mood global to the content item. For example, the Shakespeare play Hamlet is a play of the tragedy genre, and has a gloomy mood reflected even in the scenes of comic relief. All portions of Hamlet may accordingly be assigned characteristics such as "tragedy" or "gloomy."

At block 310, the context module 125 determines at least one recommended content portion to be presented to the user. In some embodiments, the recommended content portion may be determined based at least in part on the one or more context attributes associated with the user's context (determined at block 306) and at least one content characteristic associated with the recommended portion (determined at block 308). For example, if the context module 125 determined at block 306 that the user is currently running through downtown Los Angeles, the context module 125 may select a portion of a content item stored in the recommendation data store 116 that relates to running, has an inspiring tone and/or mentions locations in downtown Los Angeles. In some embodiments, a recommended portion of content may be selected based at least in part on prior feedback from users regarding content portions. User feedback considered by the context module 125 may include context-specific feedback indicating that a content item was enjoyable or appropriate in the given context (such as the user indicating that a content item was appropriate for listening to while running in an urban environment) and/or may include general feedback which a user provided for a content item or portion of a content item while the user was in a given context (such as the user giving a positive rating for an item that the user listened to while in a similar context).

In some embodiments, a recommended portion of content may be selected based at least in part on retrieved context-to-characteristic association information that associates one or more context attributes with one or more characteristics of content that would be appropriate to recommend for context or situations associated with the given context attribute(s). The context-to-characteristic association information may be stored, for example, in recommendation data store 116. For example, the association information may indicate that the "running" activity is associated with content characteristics that include "upbeat," "inspiring," and/or others. In some embodiments, the context module may associate certain context attributes with content characteristics that may be aimed at causing certain changes in mood for the user, such as by recommending content portions with a happy mood when the current context is a dark, rainy day. In other embodiments, the context module 125 may associate content portions directly with context attributes, without a separate mapping of context attributes to content characteristics. For example, in some such embodiments, a scene in an audio book that takes place in Central Park may be associated with a location attribute "Central Park" in recommendation data store 116, which may directly match a "Central Park" location context attribute without any mapping or association table lookup needed.

Depending on the embodiment, the context module 125 may determine a content portion that most closely matches the given context based on different considerations. For example, the context module 125 may consider how many of the context attributes for the current context match the content characteristics for the portion, how many users have consumed the given content item in a similar context or the same context, the rating or feedback of users regarding the item and/or the specific portion of the item, how similar the one or more users that previously consumed the item are to the user for whom the recommendation is being generated, the user's consumption or purchase history, the user's preferences, and/or other considerations.

The manner in which the context module 125 determines the one or more content portions to recommend to the user for consumption in the given context may vary depending on the embodiment. For example, the context module 125 may assign scores to each of a number of content portions indicating how appropriate the portion is for the given context. The context module may select a single content portion to recommend, or may provide a list of content portions. The list of content portions may include content portions from different content items, such as excerpts from multiple books. As will be appreciated, any of a number of known recommendation techniques may be applied to sort, filter and/or adjust the recommendations based on the context attribute information, content characteristic information, user information, user behavior data, item purchase data, item attributes and/or other information.

Once the context module 125 has determined the one or more content portions to recommend in the given context, the context module 125 may cause presentation of one or more options that enable the user to access the recommended content portion(s), at block 312. For example, the context module 125 may generate a user interface for display on the computing device 102 that provides information identifying the one or more items from which the content portion(s) were selected and/or provides a preview of the content portion (such as a textual quote of words spoken in a recommended portion of an audio book). In some embodiments, the user interface may include an option for each item from which a portion was recommended that enables the user to purchase the item from retail server 110 or from another source. In other embodiments, a user interface may provide free access to stream, download or otherwise access a recommended content item. In other embodiments, the context module 125 may select a recommended content portion from among digital content items already purchased by the user and available to be consumed on the user computing device 102 without being obtained from another source.

In some embodiments, the context module 125 may cause the one or more recommended content portions to be automatically presented to the user by computing device 102. For example, a number of recommended content portions may be added to a playlist of audio, video or other content that the user is currently listening to or otherwise consuming. In other embodiments, recommended content portions may be presented contemporaneously with other content that the user is consuming. For example, if the user is listening to music using computing device 102, one or more recommended excerpts from an audio book may be played during slow or quiet portions of the music and/or during portions of music that do not include vocals. In embodiments in which multiple content portions are recommended (whether from the same or different content items), the content portions may be identified for playback selection by the user, may be presented in a continuous playlist one after another, and/or may be presented intermittently. Intermittent presentation may include delays between presentation of recommended content portions, where the delay is based on user settings and/or determined by the context module based at least in part on the context. The illustrative method 300 ends at block 314.

Figure 4:
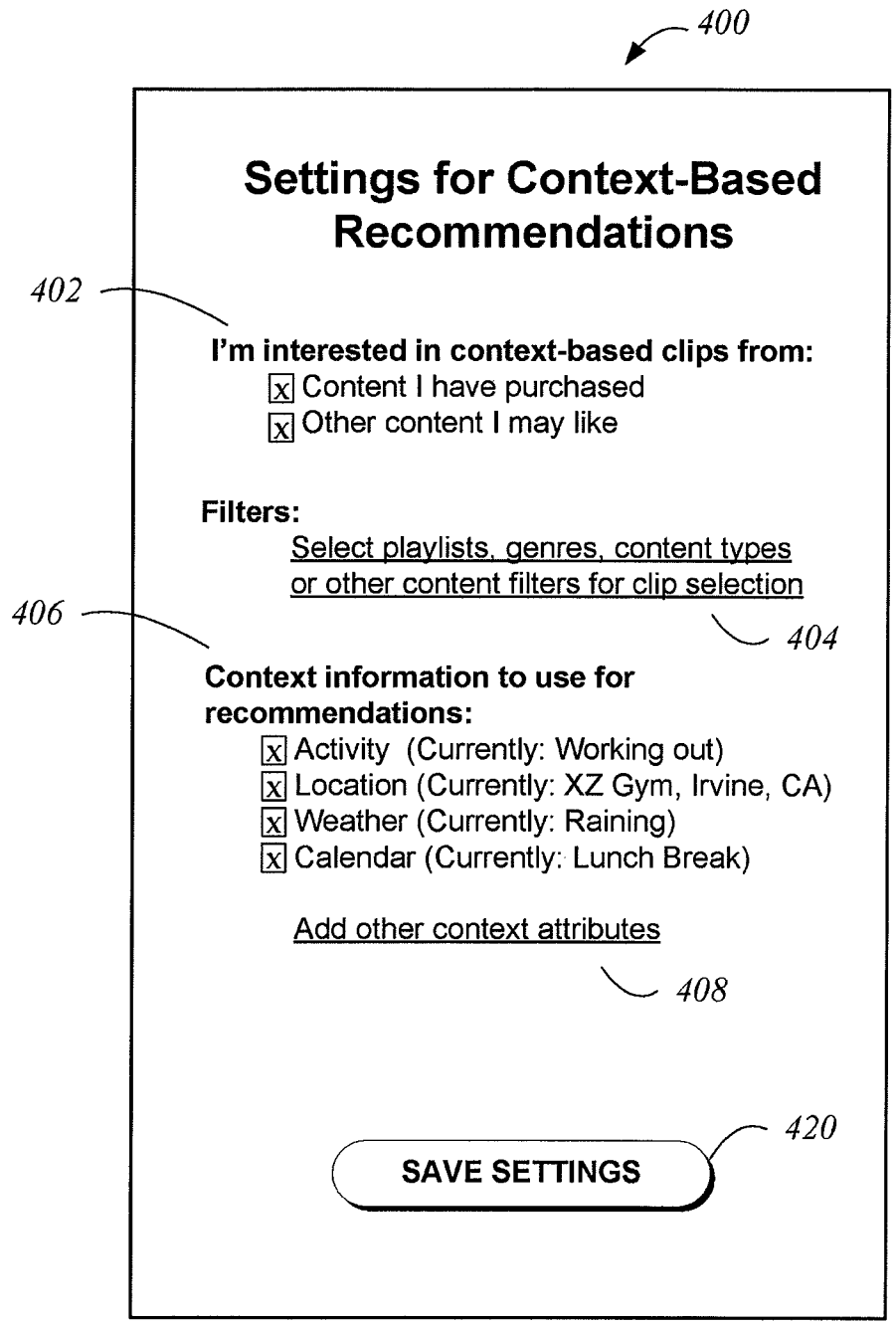
FIG. 4 is an illustrative user interface generated at least in part by a context module that enables a user to select various options to be considered by the context module in recommending context-based content portions.

FIG. 4 is an illustrative user interface 400 generated at least in part by the context module 125 that enables a user to select various options to be considered by the context module in recommending context-based content portions. Options 402, for example, enable the user to indicate whether the context module should recommend content portions from content items that the user has already purchased (such as content items stored in content data store 106 and/or available for streaming from a network-based content source) and/or from content items that the user has not purchased (such as content items available for purchase from the retail server 110). The user may select filter options 404 in order to select content item playlists, groups, genres, categories, content types, or other content filters that narrow the source content from which the context module 125 should selected content portions. For example, the user may indicate that he is only interested in recommended content portions selected from audio books by a certain author, of a certain genre, spoken by a certain narrator, having a certain tone or mood, and/or other criteria.

The user may select from context criteria settings 406 in order to identify which context attribute types should be considered by the context module 125 in determining content portion recommendations. The illustrated context criteria settings 406 include an indication of the user's current context attribute values for each listed context attribute type. For example, the user may indicate whether the context module 125 should consider the user's current location when generating content portion recommendations. The user's current location is indicated as "XZ Gym, Irvine, Calif.," which may have been determined by the recommendation server 120 and/or the computing device 102 based at least in part on GPS or other data geo-location data of the computing device 102. The context criteria settings 406 further include an option for the user to select whether the context module should consider the user's calendar entries in recommending content portions. When this option is selected, the computing device 102 may, for example, retrieve the user's electronic calendar entries for the current time and day in determining a likely activity in which the user may be currently engaged. In other embodiments, similar data may be retrieved from social network status information of the user, text messages or other messages sent by the user, and/or other sources of the user's current activity. The user may select option 408 in order to add other context attribute types and/or values that the user would like the context module to consider in recommending context-relevant content portions. The user may select option 420 in order for the settings to take effect and/or to be stored in user data store 114, recommendation data store 116 and/or other location. In other embodiments, one or more options may be presented that enable the user to select which content characteristic types should be considered by the context module in recommending content portions. As one example, a user that is not particularly concerned with which time period is associated with presented content portions may indicate that the context module should not consider time period characteristics of content when selecting recommended content portions.

Figure 5:
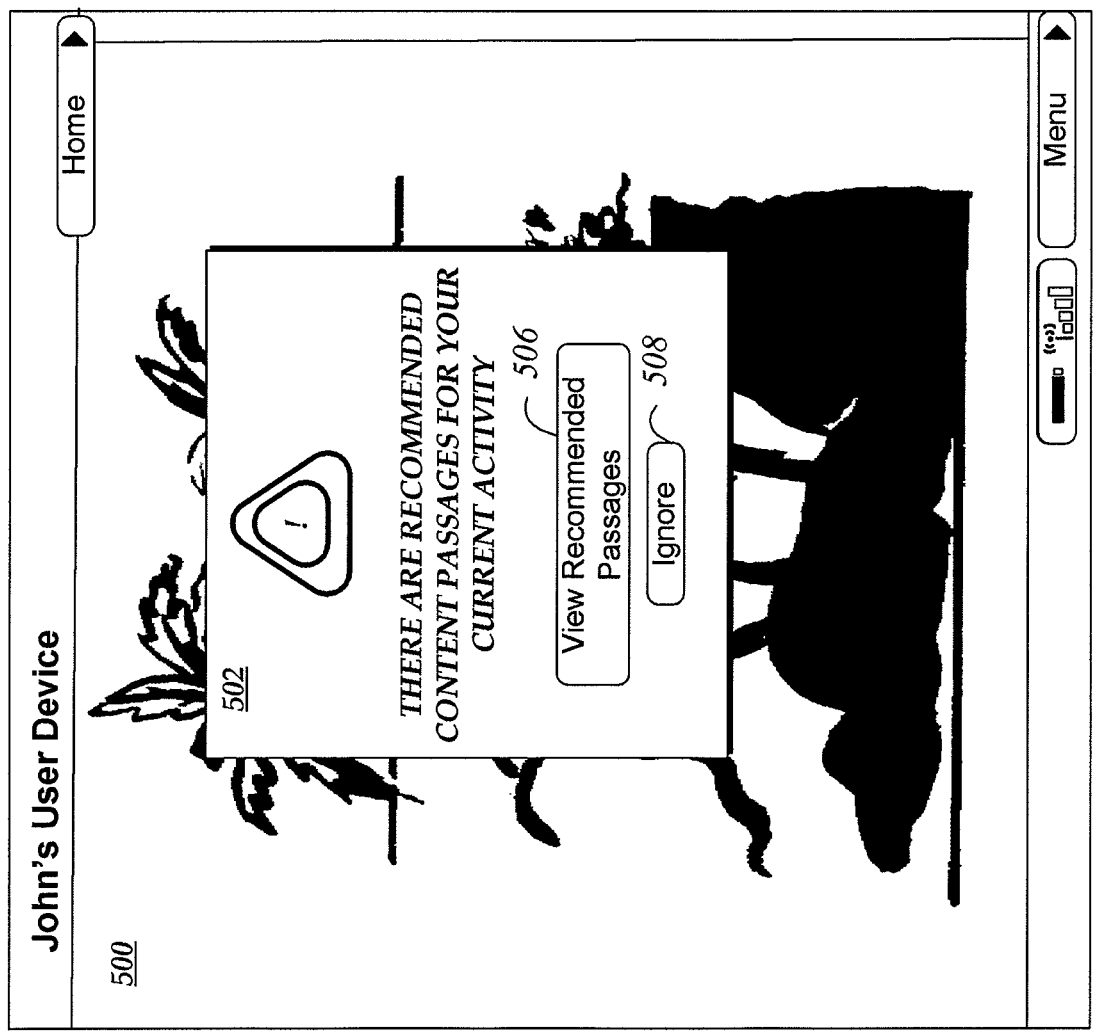
FIG. 5 is an illustrative user interface generated at least in part by a context module that notifies a user that at least one content portion recommendation has been determined for a current activity engaged in by the user.

FIG. 5 is an illustrative user interface 500 generated at least in part by a context module 125 that notifies a user that at least one content portion recommendation has been determined by the context module for a current activity engaged in by the user. As illustrated, the user interface 500 is displayed on user computing device 102. The user interface may be generated at least in part by the user computing device 102 and/or the recommendation server 120, depending on the embodiment. The user interface 500 includes a message element 502. As illustrated, the message element 502 indicates that the context module 125 has determined one or more recommended content portions or passages for the user to consume while the user is engaged in his current activity. The activity information may have been automatically detected by the computing device 102 and/or context module 125 based at least in part on geographic location data, movement data and/or any of the other context information discussed above. The user may select option 506 in order to view information identifying the recommended content portions and/or for automatic presentation of the content portion(s) to begin. If the user is not interested in listening to or otherwise consuming content recommendations during the user's current activity, the user may select ignore option 508.

Figure 6:
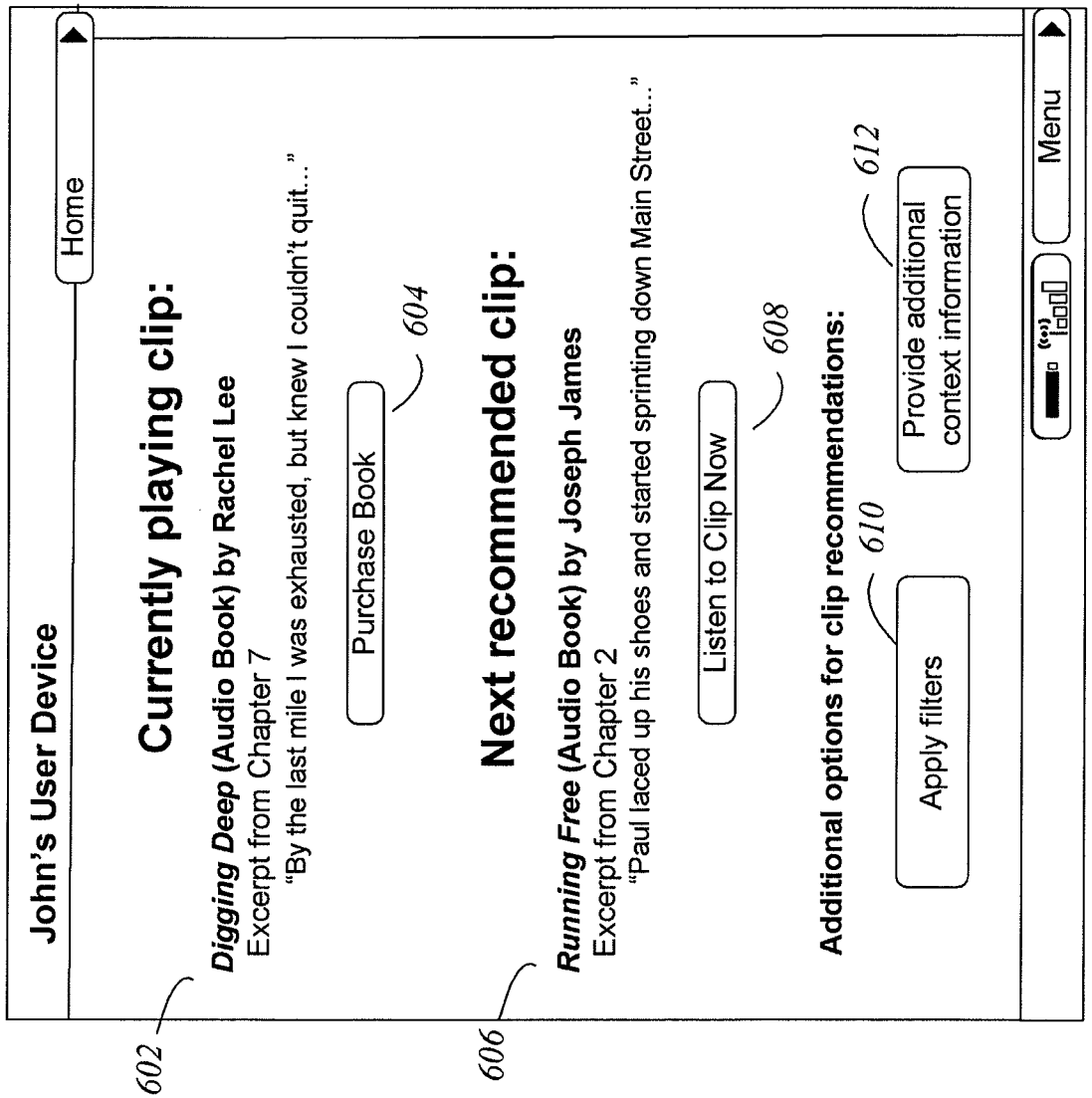
FIG. 6 is an illustrative user interface generated at least in part by a context module that displays information identifying recommended portions of audio books for the user to listen to in the user's current context.

FIG. 6 is an illustrative user interface generated at least in part by the context module 125 that displays information identifying portions of audio books recommended for playback to the user in a given context. The illustrative user interface may be presented for display on user computing device 102, for example, after a user selects option 506 discussed above with reference to FIG. 5. The user's current context may be, for example, running in downtown Denver. The context information may have been determined by the context module 125 in any of a number of manners discussed above. The context module 125 may then have determined that content portion 602 (an excerpt from an audio book) and item 606 (an excerpt from a second audio book) are appropriate to be played to the user while the user engages in the activity of running through downtown Denver. The context module 125 may have selected the portions 602 and 606, for example, based on matching context attributes of the user's activity with content characteristics of content portions 602 and 606, as discussed above with reference to FIG. 4.

As illustrated, the computing device 102 is currently playing audio content of the first recommended content portion 602. The content item from which the portion 602 was extracted, an audio book entitled *Digging Deep*, is an item that the user may purchase from retail server 110 if he would like to consume the item in full. The user interface 604 includes a purchase element 604 which may be selected by the user in order to transmit a request for the recommended content item 602 to retail server 110 or other service capable of providing access to the content item 602 in full. In contrast, the recommended content portion 606 may be from a content item that the user has already purchased and which may already be stored on the user's computing device 102. Selection of option 608 may cause the recommended content portion 606 to be audibly presented to the user immediately, rather than after the audio portion 602 is completed. While content portions 602 and 606 are both selected from audio book content items, it will be appreciated that content items of a variety of types may be searched for portion recommendations. For example, in some embodiments, a content item from which a portion may be recommended could include an audio book, an electronic book, a speech, a video, a movie, a song, an album, a game, a playlist and/or other item types.

The user may select filter option 610 in order to select one or more filters to be applied to the content recommendations. For example, the user may indicate that the user would like to apply one or more filters that limit the recommended content portions to portions of items of a certain content type or format, content portions over or under a certain length, content items over or under a certain price, newly released items, etc. The user may select option 612 in order to specify additional context information to refine the recommendations. For example, the user may enter additional context information, select from one or more context attributes to further define the context, and/or provide an indication that one or more of the previously determined context attributes does not correctly describe the context.

The user interfaces shown in and described with respect to FIGS. 5 and 6 may be incorporated into a frontend interface that directs input or recommendation requests to the context module 125. In one embodiment, the user interfaces described above may be displayed on a content page hosted on a network. When the content page is accessed by a user through a user computing device, requests for recommendations of content for a given context may be made through these user interfaces. Such a content page may call one or more functions of the recommendation service through an application programming interface (API). For example, the recommendation server 120 may be directed through remote procedure calls to generate one or more recommendations and to transmit them to the user computing device. The content page need not be hosted by the recommendation server. In another embodiment, the user interfaces shown in and described with respect to FIGS. 5 and 6 are incorporated into client software installed on a user computing device. The client software may receive input through these user interfaces, and, in response, direct remote procedure calls to the recommendation server. For example, the recommendation server may be directed through remote procedure calls to generate one or more recommendations for content portions to be consumed in a given context.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
an electronic data store configured to store content association information that associates a portion of each of a plurality of audio books with a content characteristic; and
a computing device, comprising a physical processor and memory, that is in communication with the electronic data store, the computing device configured to:
receive context information associated with a current context of a user, wherein the context information includes at least one of a current location of the user or a current activity of the user;
determine a context attribute associated with the current context of the user based at least in part on the received context information;
determine a content characteristic that is identified in stored context-to-characteristic association information as being associated with the context attribute, wherein the content characteristic is not the current location of the user and the content characteristic is not the current activity of the user;
determine a recommended portion of an audio book, selected from among the plurality of audio books, to be consumed in the current context, wherein the recommended portion of the audio book is determined based at least in part on a determination that the content association information indicates that the content characteristic that is identified in the stored context-to-characteristic association information as being associated with the context attribute is also associated with the recommended portion of the audio book; and
cause presentation of an option whose selection enables the recommended portion of the audio book to be audibly presented to the user.

2. The system of claim 1, wherein the content characteristic associated with the portion of each of the two or more audio books comprises at least one of a genre, a mood, a subject, a historical setting of the content of the portion, or a time of day associated with the content of the portion.

3. The system of claim 1, wherein the context-to-characteristic association information comprises stored information that maps each of a plurality of context attributes with at least one content characteristic.

4. The system of claim 1, wherein the stored context-to-characteristic association information comprises a table, wherein the context attribute associated with the current context of the user is identified in the table as being associated with at least the content characteristic.

5. A system comprising:
an electronic data store configured to store item association information that associates a portion of each of a plurality of digital content items with a content characteristic; and
a computing device, comprising a physical processor and memory, that is in communication with the electronic data store, the computing device configured to:
receive context information associated with a current context of a user, wherein the context information includes at least one of a current location of the user or a current activity of the user;
determine a context attribute associated with the current context of the user based at least in part on the context information;
determine a content characteristic that is identified in stored context-to-characteristic association information as being associated with the context attribute, wherein the content characteristic is not the current location of the user and the content characteristic is not the current activity of the user;
determine a recommended portion of a digital content item, selected from among the plurality of digital content items, to be consumed in the current context, wherein the recommended portion of the digital content item is determined based at least in part on a determination that content association information indicates that the content characteristic that is identified in the stored context-to-characteristic association information as being associated with the context attribute is also associated with the recommended portion of the digital content item; and
cause presentation of an option whose selection enables the user to access at least the recommended portion of the digital content item.

6. The system of claim 5, wherein each of the plurality of digital content items includes a plurality of portions, wherein a first portion of each digital content item is associated with a different characteristic than at least one other portion of the digital content item.

7. The system of claim 5, wherein user selection of the option causes the recommended portion of the digital content item to be at least one of audibly presented or visually presented.

8. The system of claim 5, wherein the digital content item comprises at least one of an spoken word audio data, and audio book, an electronic book, a speech, a video, a song, an album, a game or a playlist.

9. The system of claim 5, wherein the context-to-characteristic association information indicates that content associated with the content characteristic is appropriate to be consumed in a context associated with the context attribute.

10. The system of claim 5, wherein the context attribute is determined based at least in part on a current geographic position of a computing device utilized by the user.

11. The system of claim 5, wherein the context attribute associated with the current context comprises at least one of a time of day, a time of year, weather information or traffic information.

12. The system of claim 5, wherein the received context information is associated with at least one of a calendar entry, a task list or social network status information associated with the user.

13. The system of claim 5, wherein the context attribute comprises both an attribute type and an attribute value.

14. The system of claim 5, wherein the recommended portion is a scene in the digital content item.

15. A computer-implemented method comprising:
as implemented by one or more computing devices configured with specific executable instructions,
receiving context information associated with a current context of a user, wherein the context information includes at least one of a current location of the user or a current activity of the user;
determining a context attribute associated with the current context of the user based at least in part on the context information;
determining a content characteristic that is identified in stored context-to-characteristic association information as being associated with the context attribute, wherein the content characteristic is not the current location of the user and the content characteristic is not the current activity of the user;
selecting, by the one or more computing devices, a first portion of a first content item, selected from among a plurality of content items, to be consumed in the current context, wherein selecting the first portion of the first content item is based at least in part on a determination that content association information indicates that the content characteristic that is identified in the stored context-to-characteristic association information as being associated with the context attribute is also associated with the first portion of the first content item; and
causing presentation of an option whose selection enables at least the selected first portion of the first content item to be consumed.

16. The computer-implemented method of claim 15, further comprising causing presentation of an option whose selection enables the user to purchase the first content item that includes the selected first portion.

17. The computer-implemented method of claim 15, wherein user selection of the option causes the selected first portion of the first content item to be at least one of audibly presented or visually presented.

18. The computer-implemented method of claim 15, wherein the current context comprises an activity in which the user is engaging.

19. The computer-implemented method of claim 15, wherein the current context comprises a current environment of the user.

20. The computer-implemented method of claim 15, further comprising:
selecting a second portion of content from a second content item to be consumed in the current context; and
in response to selection of the option, causing consecutive presentation of the selected first portion of the content item and the selected second portion of the second content item.

21. A computer-readable, non-transitory storage medium storing computer executable instructions that, when executed by one or more computing devices, configure the one or more computing devices to perform operations comprising:
receiving context information associated with a current context of a user, wherein the context information includes at least one of a current location of the user or a current activity of the user;
determining a context attribute associated with the current context of the user based at least in part on the context information;
determining a content characteristic that is identified in stored context-to-characteristic association information as being associated with the context attribute, wherein the content characteristic is not the current location of the user and the content characteristic is not the current activity of the user;
selecting a portion of a content item, selected from among a plurality of content items, to be consumed in the current context, wherein selecting the portion of the content item is based at least in part on a determination that content association information indicates that the content characteristic that is identified in the stored context-to-characteristic association information as being associated with the context attribute is also associated with the portion of the content item; and
presenting information identifying the portion of the content item as a recommendation for the user.

22. The computer-readable, non-transitory storage medium of claim 21, wherein the operations further comprise causing presentation of an option whose selection enables the determined portion of the content item to be consumed.

23. The computer-readable, non-transitory storage medium of claim 21, wherein selecting the portion of the content item is further based at least in part on an application of one or more content filters.

24. The computer-readable, non-transitory storage medium of claim 21, wherein the operations further comprise determining a start location and an end location of the portion based at least in part by identifying a change in at least one of a scene or a setting within the content item.

* * * * *